United States Patent
Hensley et al.

(10) Patent No.: US 6,754,439 B1
(45) Date of Patent: Jun. 22, 2004

(54) METHOD AND APPARATUS FOR USING MULTIPLE COMPRESSED DIGITAL VIDEO AND AUDIO SIGNALS

(75) Inventors: Bentley P. Hensley, Lawrenceville, GA (US); Scott D. Orangio, Lawrenceville, GA (US); Gary J. Thomas, Lawrenceville, GA (US)

(73) Assignee: Seachange International, Inc., Maynard, MA (US)

( * ) Notice: Subject to any disclaimer, the term of this patent is extended or adjusted under 35 U.S.C. 154(b) by 0 days.

(21) Appl. No.: 09/286,749

(22) Filed: Apr. 6, 1999

Related U.S. Application Data (60) Provisional application No. 60/080,916, filed on Apr. 6, 1998.

(51) Int. Cl.[7] .............................................. H04N 5/917
(52) U.S. Cl. ..................... 386/111; 386/125; 348/423.1
(58) Field of Search ................................ 386/1, 46, 33, 386/66, 94–95, 98, 109, 111–112, 125–126; 348/423.1

(56) References Cited

U.S. PATENT DOCUMENTS

| | | |
|---|---|---|
| 4,831,446 A | 5/1989 | Nakajima et al. |
| 5,229,855 A | 7/1993 | Siann |
| 5,305,113 A | 4/1994 | Iwamura et al. |
| 5,325,131 A | 6/1994 | Penney |
| 5,504,585 A | 4/1996 | Fujinami et al. |
| 5,535,008 A | 7/1996 | Yamagishi et al. |
| 5,602,592 A | 2/1997 | Mori et al. |
| 5,635,979 A | 6/1997 | Kostreski et al. |
| 6,430,363 B2 * | 8/2002 | Sasaki et al. ................ 386/125 |
| 6,438,317 B1 * | 8/2002 | Imahashi et al. ........... 386/109 |
| 6,549,722 B2 * | 4/2003 | Okada et al. .................. 386/98 |
| 6,553,179 B1 * | 4/2003 | Miwa et al. ................... 386/94 |

* cited by examiner

*Primary Examiner*—Thai Tran
*Assistant Examiner*—Christopher Onuaku
(74) *Attorney, Agent, or Firm*—Fish & Richardson P.C.

(57) ABSTRACT

The invention relates to a method and apparatus for flexibly and reliably processing one or more MPEG signals from at least one source. The method provides for synchronizing decoded streams to a reference clock, for playing multiple streams simultaneously or for transitioning between streams in a seamless manner. The output streams can have varying formats and can include both video and audio. The structure and method further provide for the capability of skipping B frames to reach a desired reference frame quickly and to edit the MPEG streams regardless of GOP size.

18 Claims, 9 Drawing Sheets

Genlock
FIG. 7

METHOD AND APPARATUS FOR USING MULTIPLE COMPRESSED DIGITAL VIDEO AND AUDIO SIGNALS

CROSS-REFERENCE TO RELATED APPLICATIONS

This application claims priority of U.S. Provisional Application Serial No. 60/080,916, filed on Apr. 6, 1998.

BACKGROUND OF THE INVENTION

The invention relates generally to video and audio signal encoding and decoding and manipulation, and in particular, to a method and apparatus for flexibly encoding and decoding multiple MPEG digital video and audio streams.

The television industry requires the availability of high quality, full motion audio and video signals, typically emanating from different sources. In U.S. Pat. No. 5,862,312, filed Oct. 24, 1995, issued Jan. 19, 1999, and entitled LOOSELY COUPLED-MASS STORAGE COMPUTER CLUSTER (the disclosure of which is incorporated herein, in its entirety, by reference), there is disclosed a system and method for reliably and continuously delivering multiple media streams even if one of the nodes of the described cluster were to fail. These streams are typically stored as MPEG encoded streams and/or compressed audio streams. It is important to be able to switch between the various streams in a seamless, continuous and reliable manner and to provide high quality audio and video signals having on-air broadcast quality.

As the technology develops, it is also important to be able to seamlessly switch between different MPEG streams, to provide multiple streams, and to decode incoming streams "on-the-fly" so that no interruptions occur in the output video or audio.

SUMMARY OF THE INVENTION

The invention relates to a method for playing the decoded MPEG signals in a flexible and structured manner. In one aspect, the invention relates to receiving, at a high data rate, plural MPEG data encoded streams from at least one source, decoding the received streams, and synchronizing the multiple decoded streams to a reference clock.

In another aspect of the invention, there is provided a structure which allows the user to play multiple stream inputs simultaneously. The multiple output streams can have varying formats and can include both video and audio streams.

The invention also provides the ability to play any type of MPEG file immediately followed by another file and to do so seamlessly. The invention further provides the ability to skip B frames to obtain a desired reference frame quickly. Further, the invention enables the user to edit MPEG streams regardless of the GOP size. The editing can be accomplished for GOP sizes of two or greater.

BRIEF DESCRIPTION OF THE DRAWING

Other objects and features of the invention will be apparent from the following drawings, taken in connection with the description, in which.

DESCRIPTION OF PARTICULAR EMBODIMENTS OF THE INVENTION

Figure 1:
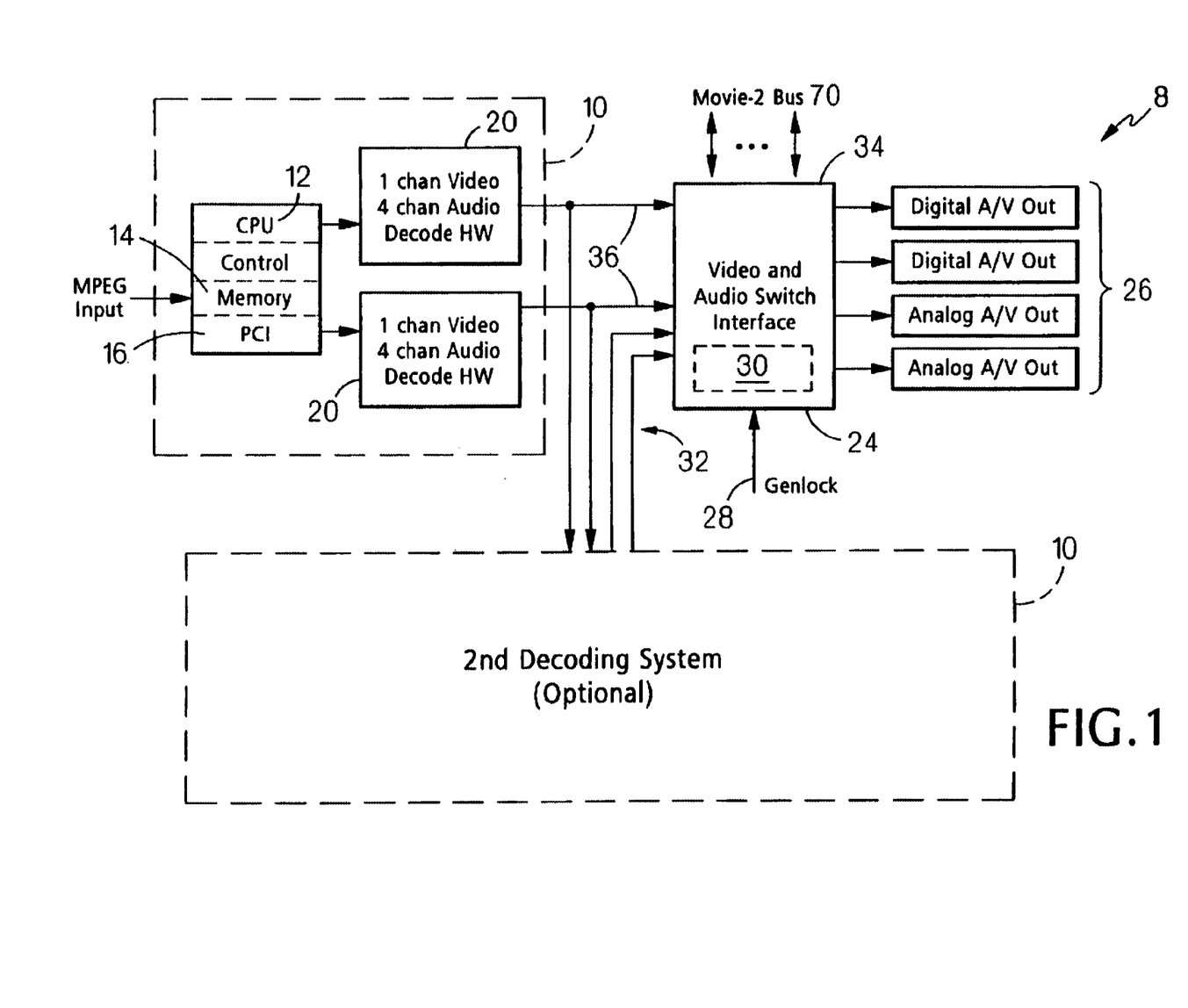
FIG. 1 illustrates an overall functional block diagram of the apparatus of the invention.

Referring to FIG. 1, a decoding system 8 according to the invention has a controller 10, incorporating a central processing unit (CPU) 12, a random access memory 14, a PCI interface 16, and MPEG decoders 20, and an interface switch 24, having digital and analog outputs 26, a GENLOCK input 28, audio and video switching 30, a decoder to decoder interface 32 and a Movie2 bus interface 34.

The decoding system produces two independent switchable channels of analog or digital video and four independent switchable stereo channels of analog or digital audio (available over lines 36) from compressed MPEG data delivered over the PCI bus. The PCI bus can operate with a 33 Mhz, 32-bit data bus architecture that shares bus bandwidth between a PCI controller 42 (FIG. 2) through bus master arbitration. Each channel has an MPEG decoder 20 and, with an optional second decoding system, four (4) MPEG decoders 20 can be used, each providing two stereo channels of audio and one channel of video decompression. These decompressed audio/video streams are switched using an "on-the-fly" re-programmable digital cross-point switch 30 to connect to any analog or digital output 26.

As suggested above, two or more decoding systems can be connected together to add additional channels and more robust switching capabilities. When two systems 8 are connected according to the invention, a "master-slave" configuration is used, and a total of four analog/digital (a/d) video and eight aid audio stereo channels can be "on-the-fly" switched to any outputs. This configuration of re-programmable switching is very useful in "Program/Preview" applications typically used in a broadcast environment. This switching capability can also be used in a variety of editing applications.

In addition to the switching capabilities described above, the decoding system 8 provides an interface to signals from off-the-shelf video effects units. This is accomplished using a Movie2 bus 70 (see FIG. 1). A Movie2 bus is a board-to-board interconnect standard that provides a 27 Mhz time-multiplexed uncompressed multi-channel video exchange between connected units. Based on CCIR 601, SMPTE126M and EBU technical specifications, a Movie2 bus allows professional audio/video products to interconnect and exchange full-resolution studio quality video without burdening local CPU busses. The Movie2 bus supports a sustained aggregate data rate well in excess of 300 MBps (MegaBytes per second).

Use of a Movie2 bus allows the decoding system, in accordance with the illustrated embodiment, to route video to, from and/or through other units that support the Movie2 bus. Movie2 signals are switched using the cross-point switch 30, of switch 24. This allows decoded MPEG outputs to be routed to a Movie2 bus and signals from a Movie2 bus to be routed to the system's digital and analog outputs 26. To achieve a maximum set of features, two decoding systems would be connected, as noted above, through a master-slave bus while a special feature unit would be connected to the master decoding system through a Movie2 bus connection 70. Thus, decoded video from multiple channels can be routed through Movie2 bus 70 and connected to special effects units (such as character generators, still stores, 2D and 3D effects/mixers, etc.)

The result can be displayed before or after passing through switch 30, and can be routed back through an MPEG encoder to encode any resulting edited video.

Figure 2:
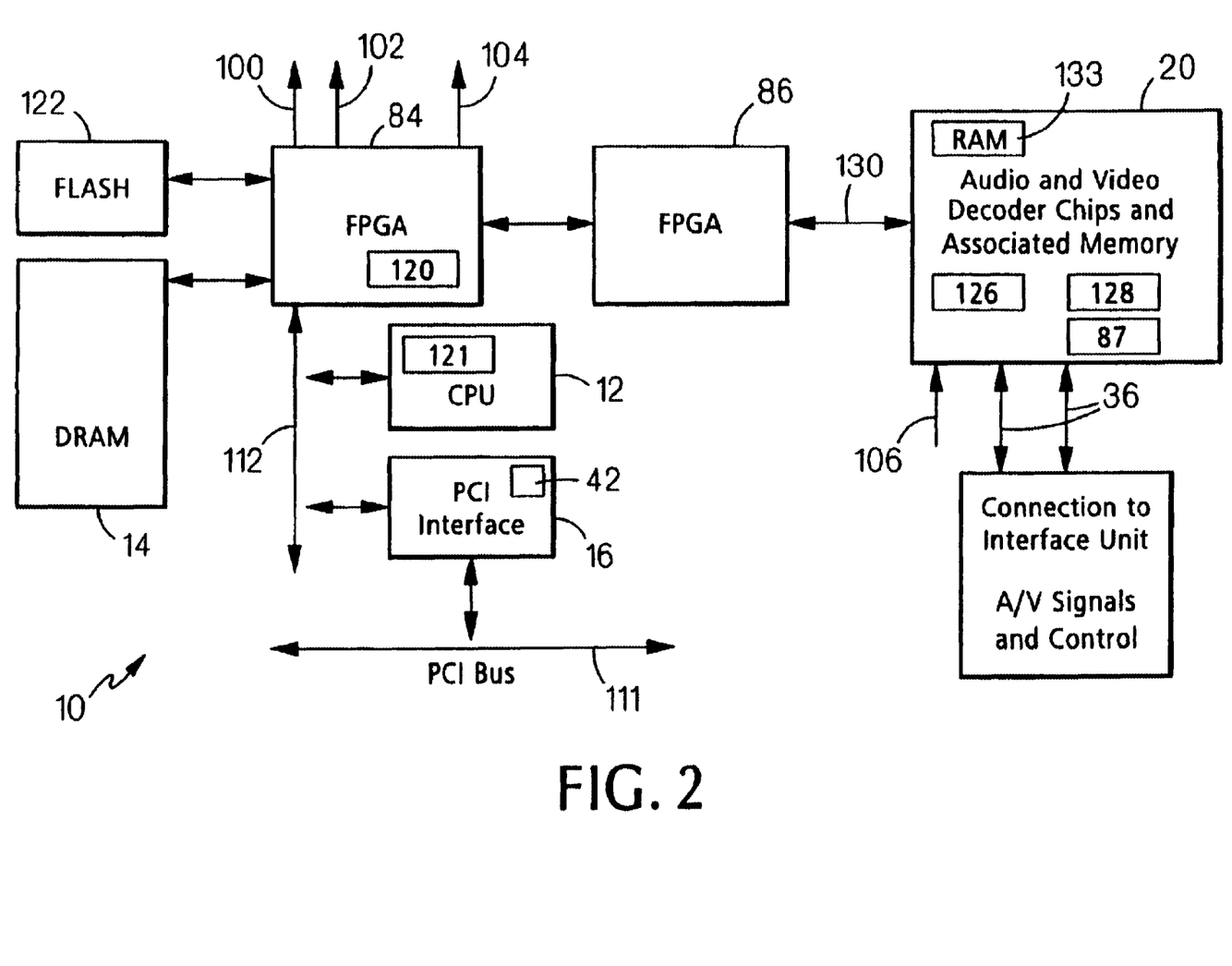
FIG. 2 shows a more detailed schematic diagram of a controller in accordance with the invention.

Referring to FIG. 2, the controller 10 consists of the following major functional elements: the CPU 12 and the PCI Control 42 for the PCI bus 111 through PCI interface 16, RAM 14, an FPGA (field programmable gate array) Control 84, FPGA unit 86, two MPEG Audio/Video Decoders 20, Audio/Video Switch 87, Audio/Video Outputs 36, Peripherals and a System Sync. These functional areas combine to produce two independent switchable channels over lines 36, outputting analog/digital audio and video from MPEG data delivered through PCI bus 111. The embedded CPU processor 12 (for example, an Intel 80960HA) controls high speed data transfers from the RAM to the audio/video decoders 20. A local Bus/PCI bus master interface chip acting as PCI controller 42 (for example, PCL Technology PCI9080) performs high speed data transfers from the PCI bus to the RAM, controlled by logic in the FPGA 84. The embedded processor also performs audio/video initialization and assists with an MPEG video decoding for each audio/video decoder channel over outputs 36. The controller contains two serial ports 100, 102, and status LED's over lines 104 for external status/monitoring. An external system sync (external video input) at 106 provides optional synchronization for all channels of a system.

CPU and PCI elements include the PCI bus interface 16, embedded CPU 12, a CPU Boot PLX 121 and the controller FPGA logic 84.

The, system receives MPEG data through the PCI bus interface 42. A PCI interface chip 110 controls the interface function between the PCI bus 111 and an embedded CPU's local bus 112. The PCI interface 16 requests the CPU bus 112 (becomes local bus master) in order to transfer data in a burst mode, into and out of local RAM 14.

The embedded CPU processor 12 is used to control MPEG data movement to the two audio/video decoders 20, initialization of the audio/video decoders and initialization/management of the system.

The CPU 12 shares a bus with a PCI bus master interface chip 110 (of interface 16) and a DMA bus master control 120 located in a controller FPGA 84. RAM control is performed by the controller FPGA 84 and direct memory access (DMA) and I/O control are processed by the controller FPGA 84. Chip selects, CPU start-up logic and FPGA programming control are performed in the CPU boot PLD 121.

A boot sectored flash memory 122, (for example, 512 K×8) provides initialization code for CPU boot operations. Application code is downloaded to RAM as part of an initialization process. Mainline CPU code is processed from RAM. Serial ports 100, 102 or the PCI interface 16 can be used to download new code to the flash memory 122. FPGA configuration(s), video quantization tables and other non-volatile configuration data is stored in flash memory as well.

The decoding system decompresses two channels of video and four channels of stereo audio. Video can be displayed at SIF, half D-1 or D-1 resolutions in NTSC or PAL formats in accordance with the invention. Audio outputs can be mono, dual mono, stereo or joint stereo. The MPEG decoder (for example, an IBM MPEGCD21) decodes compressed source material having one of the formats listed below:

MPEG packetized elementary stream (PES), as defined by ISO/IEC 13818-1

MPEG-2 video elementary stream, as defined by ISO/IEC 13818-2

MPEG audio elementary stream, as defined by ISO/IEC 11172-3, Layers I and II

MPEG video elementary stream, as defined by ISO/IEC 11172-2

ISO/IEC 11172-1 packets

Supports 4:2:2 chroma format, 1PB data at up to 50 Mb/s The MPEG decoder 20 extracts MPEG DTS/PTS time stamps from packetized data streams and associates these time stamps to synchronize the audio/video outputs. Digital video outputs are transferred through an audio/video decoder switch to programmed analog and digital video/audio outputs 36. Video is converted to analog using a digital video encoder 126. Digital audio outputs are likewise converted using a digital-to-analog audio converter 128. Audio/video analog outputs are buffered and amplified prior to final output. The decoding system provides CPU controlled audio level adjustments and fine tuning adjustments through the interface switch 24 (FIG. 1). Video can also be converted to serial D1, component digital video, through the interface switch. In addition, a digital audio bit stream can be converted and output as AES/EBU type digital audio.

MPEG compressed data is input through the FPGA's 84, 86, which create a serial input/output on bus 130, a sixteen bit data bus, which is shared, for asynchronous reads and writes, to an internal processor of an MPEG decoder chip. Bit and display buffers are dynamically sizable and are located in the MPEG decoder's dedicated RAM 133. RAM can be configured for 4:2:0, D1, for 4:2:2, D1, or for 4:2:2, full CCIR 601 resolution.

In the illustrated embodiment, the audio/video decoder 20 has a 27 MHz operational clock implemented using a VCXO/system sync circuit located on the interface switch 24. Audio and video specific clocks are produced by an internal PLL circuitry of the MPEG decoder. Audio PCM clocks and a 256 fs clock (256 times the sampling frequency) are output to an A/V cross-point switch 30 of the interface switch 24. The VCXO/system sync function also produces vertical and horizontal sync signals to all MPEG decoders 20.

Figure 3:
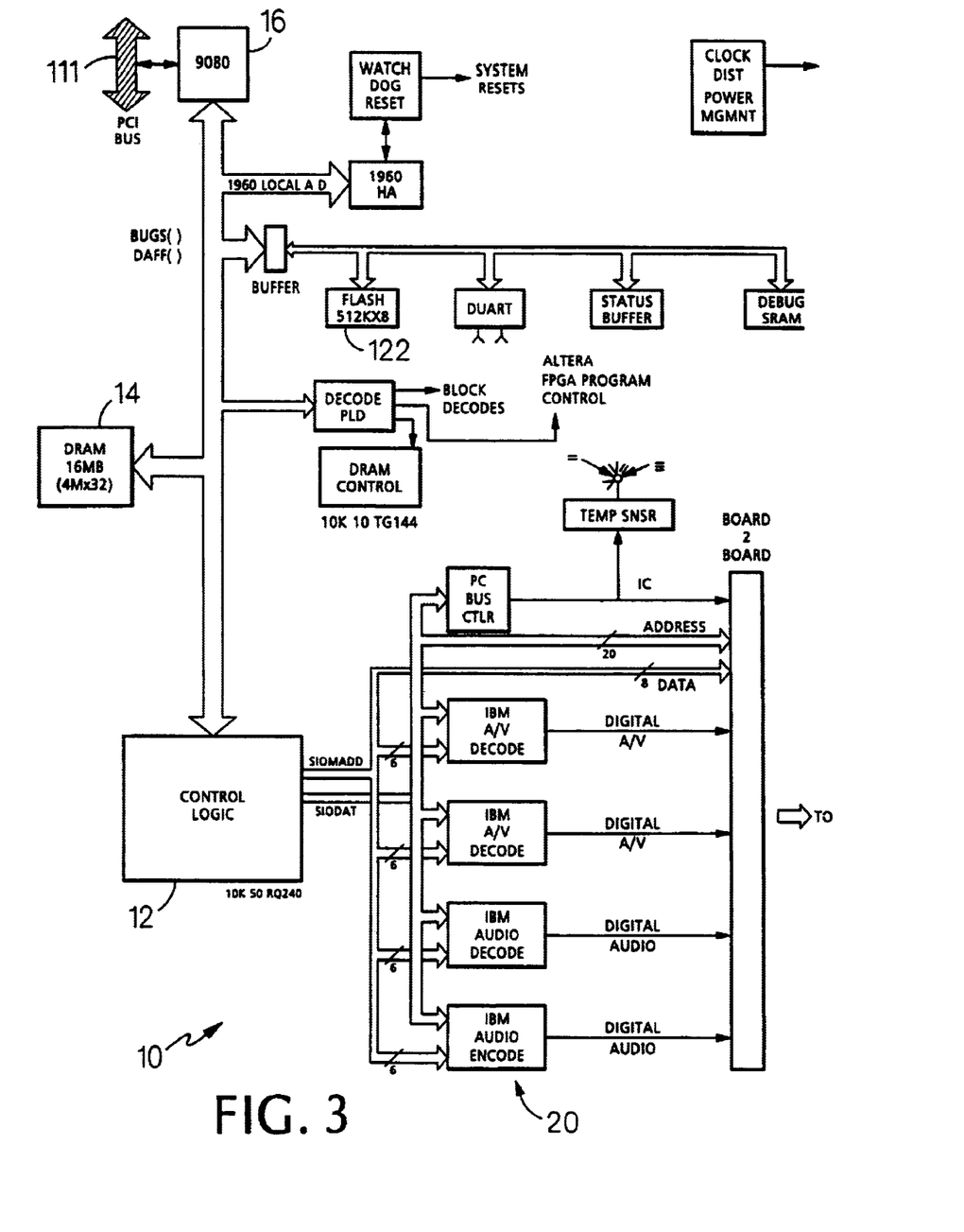
FIG. 3 illustrates a more detailed schematic of the controller of FIG. 2.

Audio levels are controlled by software programming of the MPEG decoder's attenuation registers and/or programming audio level adjust ICs located on the interface switch 24. A more detailed schematic block diagram of the control 10 is illustrated in FIG. 3.

Figure 4:
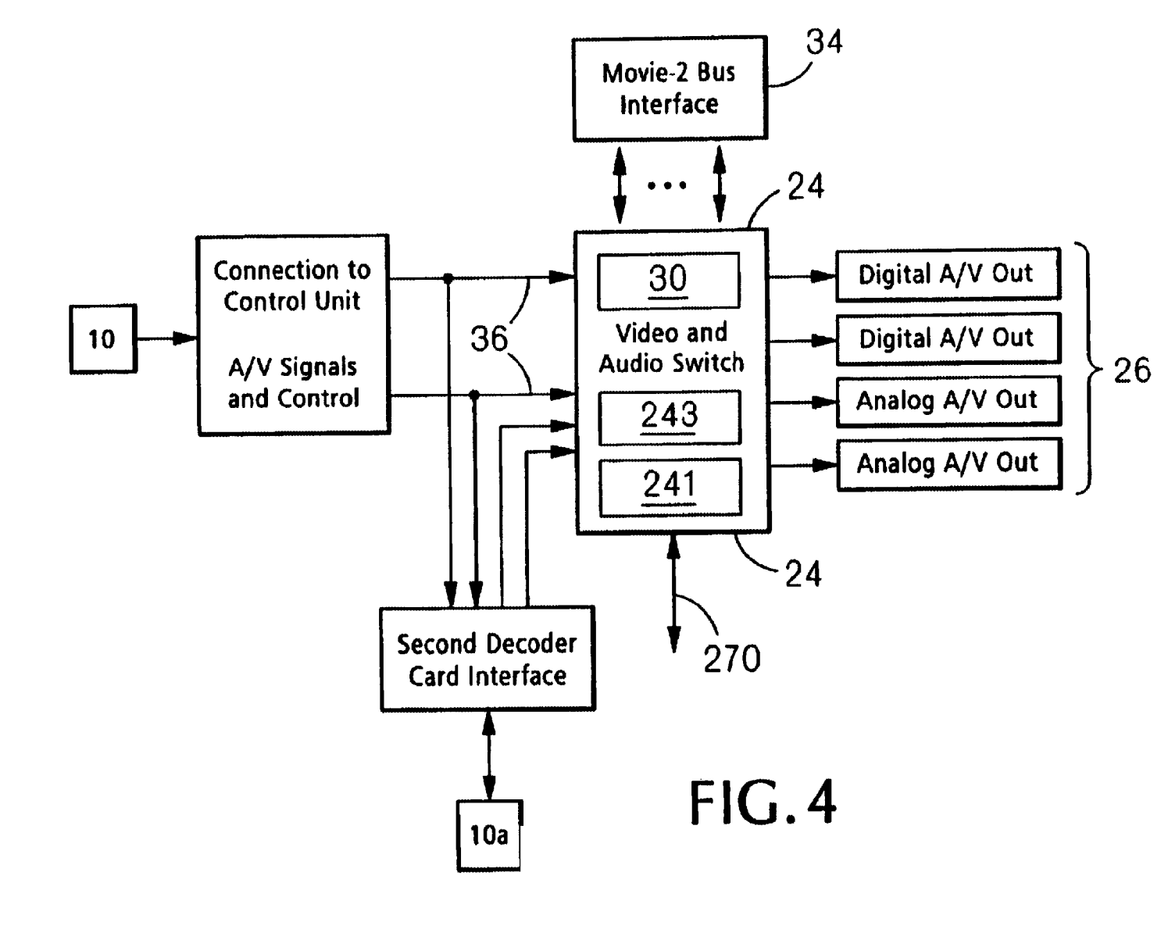
FIG. 4 illustrates a schematic diagram of an interface switch in accordance with the invention.

Referring to FIG. 4, interface switch 24 receives decoded digital audio/video data from the controller 10 as well as optionally from another decoding system 10a and/or the Movie2 bus interface 34. Digital audio and video are switched using the re-programmable cross-point switch array 30. The audio/video signals can be switched to: (1) on-board output circuitry, (2) another decoding system, or (3) a Movie2 bus interface—from: (1) on-board decoders, (2) another decoding system, or (3) a Movie2 bus interface. The output can be broadcast quality analog audio, AES/EBU digital audio, broadcast quality analog video and SMPTE serial D1 (component digital) video. The interface switch 24 also provides line locked GENLOCK for all video channels and color locked GENLOCK for analog video channels.

The re-programmable cross-point switch 30 is used to reconfigure connections of decoder 20 audio/video outputs 36. Each MPEG decoder audio and video output over lines 36 (from either a master or slave decoder) can be connected to one of analog and/or digital outputs 26 of the interface switch. This switching arrangement provides program and preview functions which are used throughout the broadcast industry. It also provides an ability to route signals to and from a daughter card, and to and from a Movie2 bus 70, providing a wide variety of an on-air, on-line and off-line editing and effects capabilities.

Using the structure described above, the apparatus of the invention provides the ability to play any type of MPEG file immediately followed by another file. The transition between files is seamless and is controlled by the embedded CPU 12 of the controller in conjunction with the interface switch 24. In particular, the first MPEG stream is stored in the CPU memory 14 and is decoded using one of the decoders 20. As that stream is being played, the second stream is stored in the CPU memory 14 and is available for decoding by the other decoder 20 of the controller 10. At the correct time, the second stream begins playing by the action of the cross-point switching array 30. For example, that array switches the first input stream over lines 36 to the second input stream over those lines in a seamless and continuous manner so that the output over the analog/digital audio/video outputs 26 is provided with a seamless transition from the first stream to the second stream.

In addition, the decoders 20 are flexible enough to handle varying formats. Not only can they handle different input formats, but they can also provide multiple output formats as well. As an example of the flexibility of the system, both decoders can be operating simultaneously on different input streams and the outputs, over the lines 36, from each switch to the cross-point switching array 30 can then be connected to the correct output lines 26. Accordingly, the invention provides for the output of multiple streams, simultaneously, one stream, and for a transition between two streams.

The control circuitry 10 also enables the system to skip a plurality of so-called B frames in order to get to the desired reference frames more quickly. The skipped frames need not be played and can, accordingly, be discarded.

As noted above, all of the input streams can be synchronized to the same reference clock so that, using the GENLOCK signal and circuitry, they can be synchronized to each other. In addition, the structure of the invention can be used to enable one stream to be previewed while the other stream is being played as an output, that is, on-air. The previewed stream can be directed to either the Movie2 bus directly or to a separate output directed to a display monitor at, for example, the studio itself. In this manner, different video streams can be reviewed while a known stream is being output for broadcast. In those instances when, referring to FIG. 1, a second decoding system is employed, yet greater flexibility can be obtained with the control elements preferably operating in the master-slave relationship.

Movie2 Bus Function

The Movie2 bus 70 provides a standard passive back plane interface 34 to add special features to an output of a decoder. Mixing, 2D video effects and linear and alpha keying are a few special features that can be added. The Movie2 bus is located on the interface switch on which I/O is processed using the cross-point switch 30 and programmable logic located in an interface FPGA 241.

Interface EPLD

An Interface EPLD 243 provides two channels of YUV to SMPTE-125 parallel D1 conversion (for data sent to D1 digital video converters), video GENLOCK PLL control, video Hsync, Vsync and field timing, SMPTE-125 embedded audio packaging, LITC data intput and output formatting, and miscellaneous hardware control. Miscellaneous hardware control communicates to the control 10 through a serial input/output (SIO) bus 270.

Figure 5:
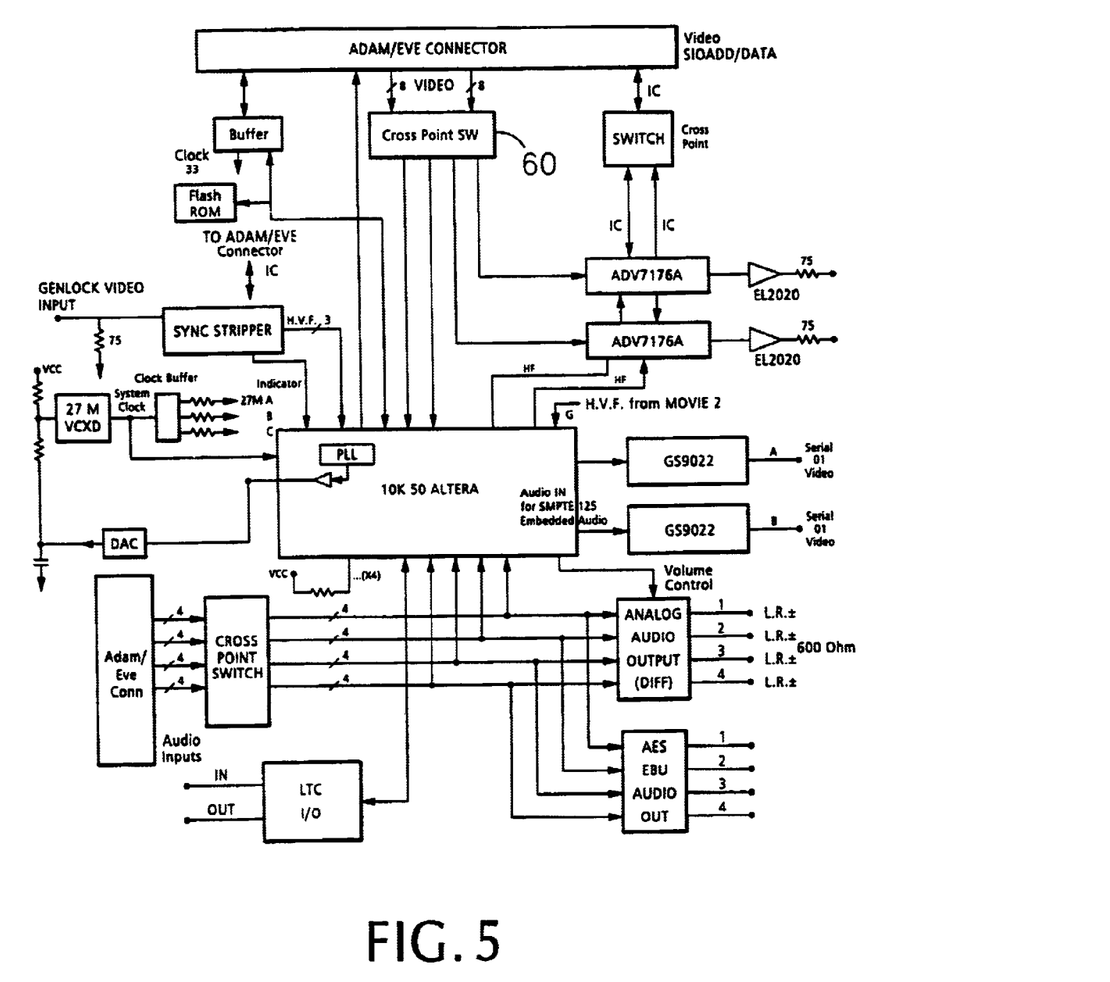
FIG. 5 illustrates a more detailed schematic of the interface switch of FIG. 4.
Figure 6:
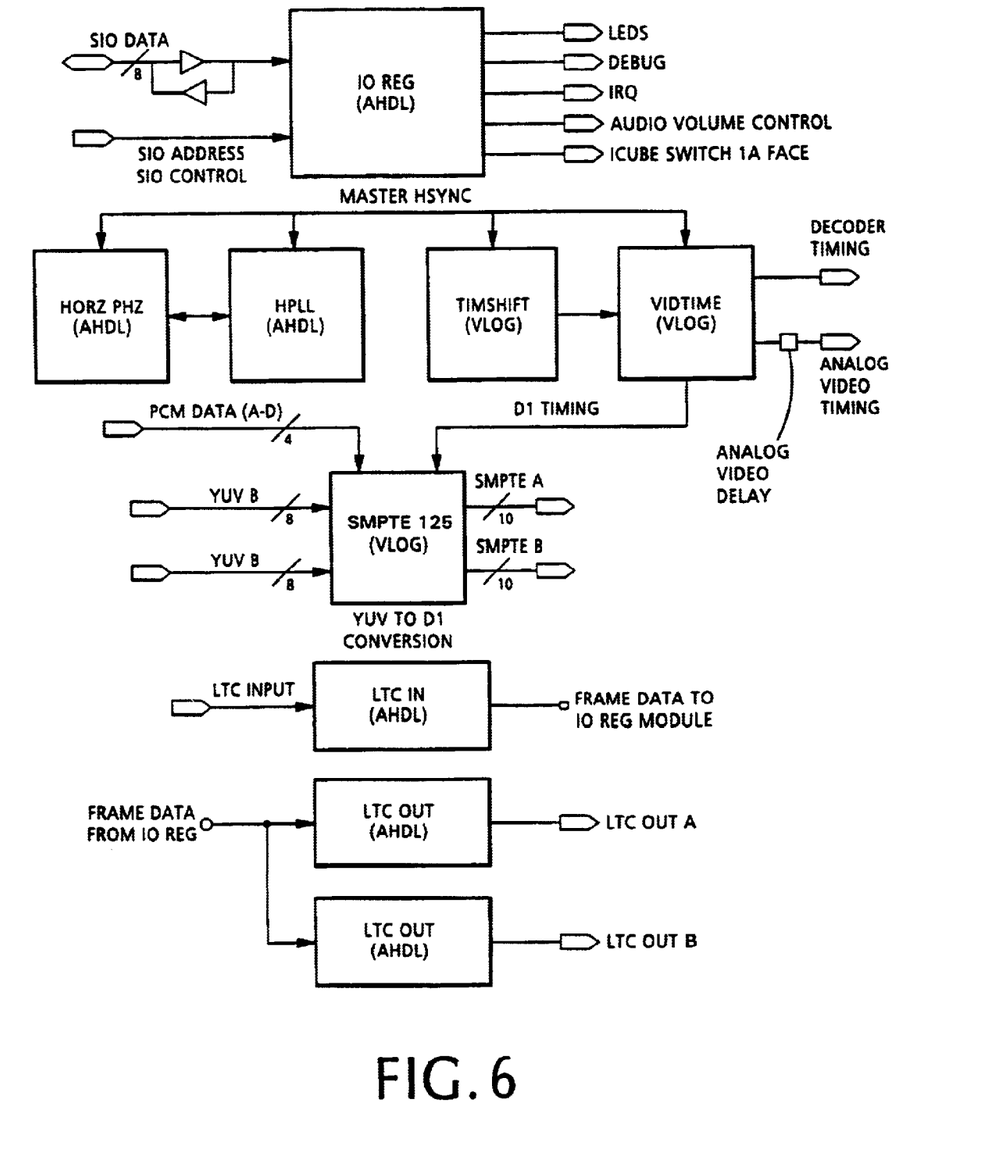
FIG. 6 illustrates the interface switch FPGA.

A more detailed schematic description of the interface switch is provided in FIG. 5 and FIG. 6 (interface switch FPGA).

Video GENLOCK PLL Control

Figure 7:
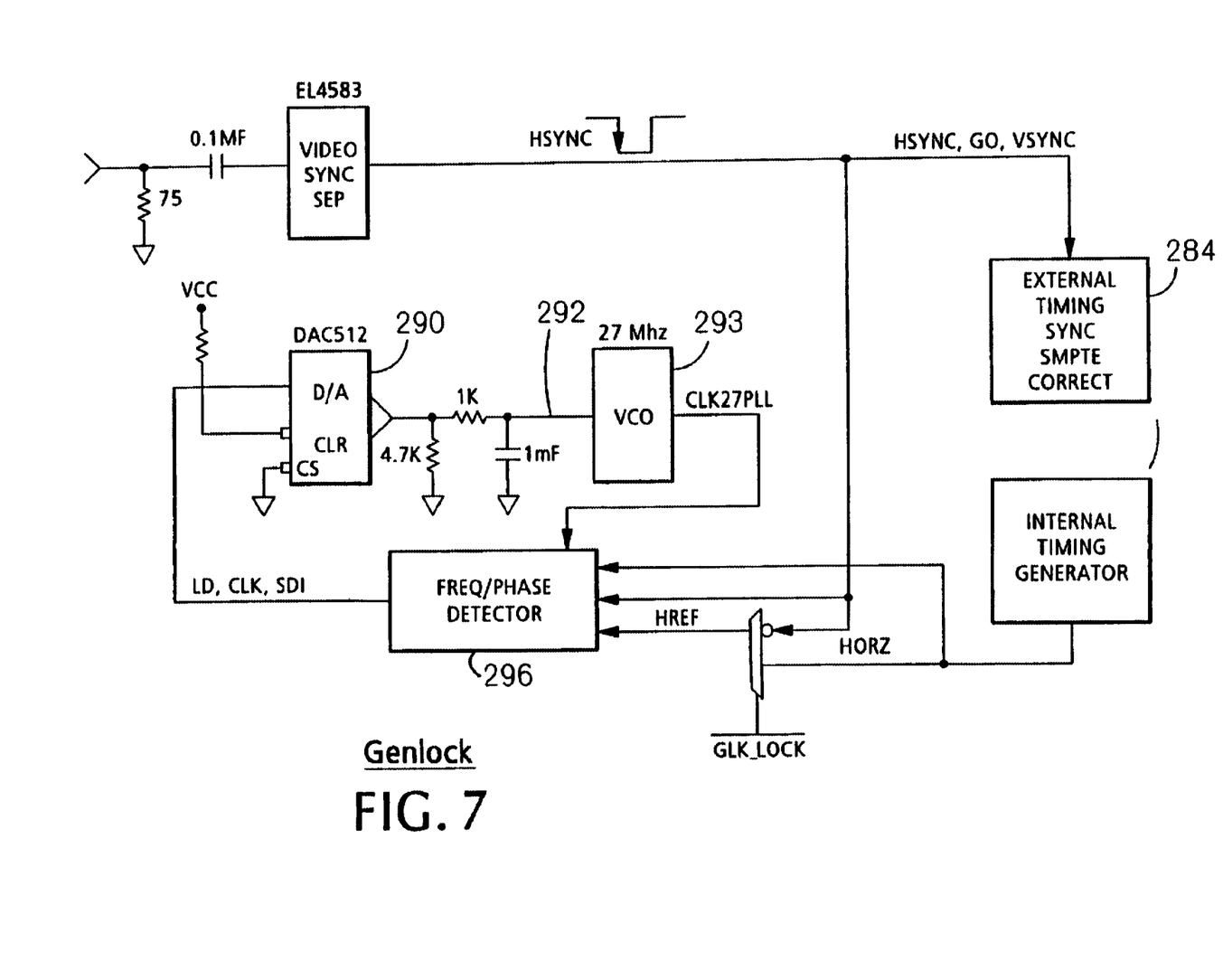
FIG. 7 illustrates a GENLOCK circuitry in accordance with the invention.

Referring to FIG. 7, an FPGA is used to provide video GENLOCK control between an on board VCXO 293 and an external reference 284. The internal VCXO is locked in frequency and phase to the external video hsync. If an external clock source is not present, a control voltage will be set to a mid-range frequency of the VCXO.

System GENLOCK uses the VCXO clock source 293, the FPGA and a 12 bit digital to analog (D/A) converter 290. All of the phase-locking intelligence is located in the FPGA. The D/A converter 290 is updated every horizontal sync period. The D/A converter responds, in approximately 16–32 usec, by changing its output analog control voltage over line 292 to the VCXO 293. The FPGA creates an outgoing horizontal sync ($H_{out}$) (as well all other video timing) based on the VCXO clock frequency.

The outgoing horizontal sync ($H_{out}$) locks to incoming horizontal sync ($H_{in}$) through a two step process. Each step uses digital logic to produce the desired response.

Figure 8:
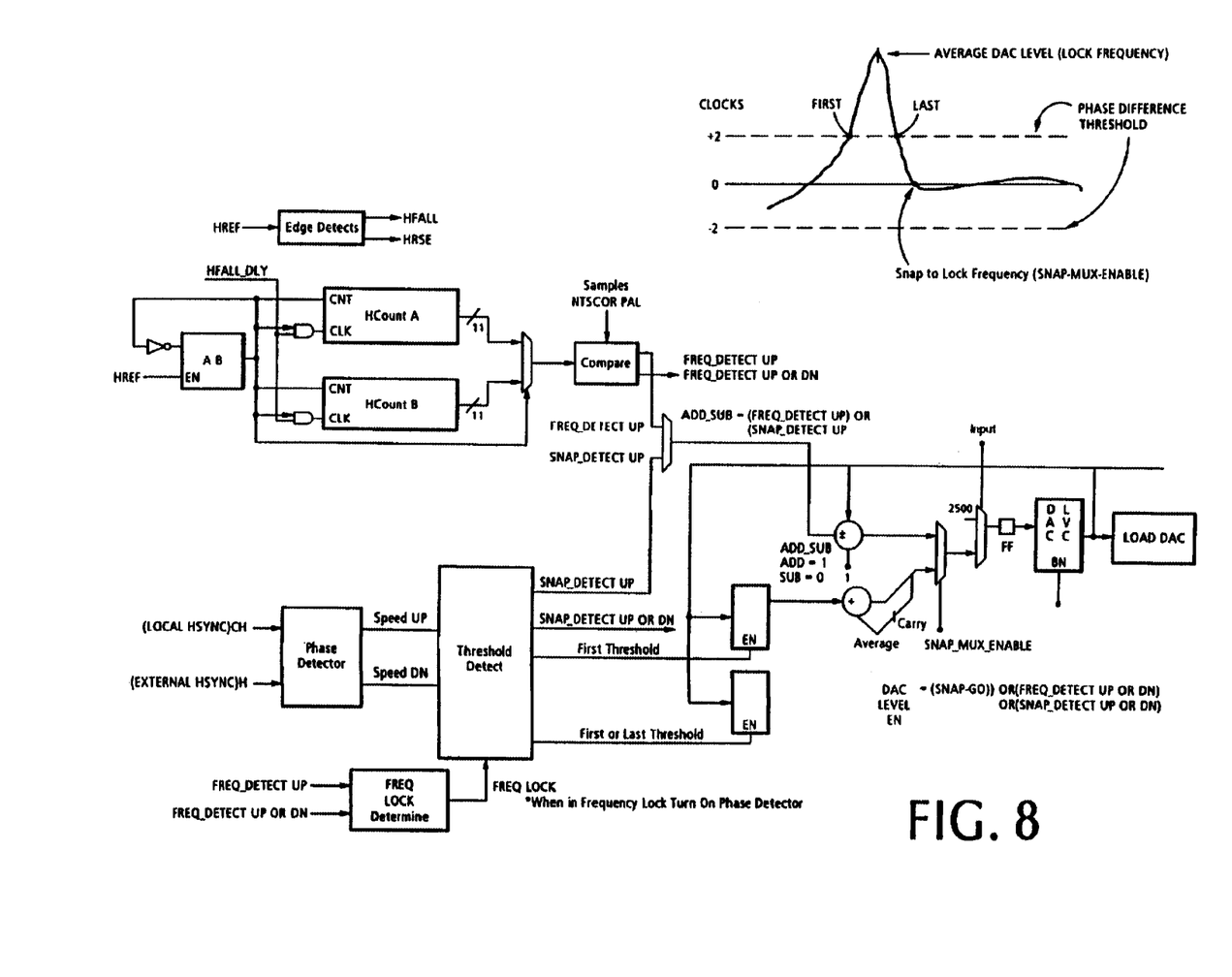
FIG. 8 illustrates schematically the frequency phase detector circuitry in accordance with the invention.
Figure 9:
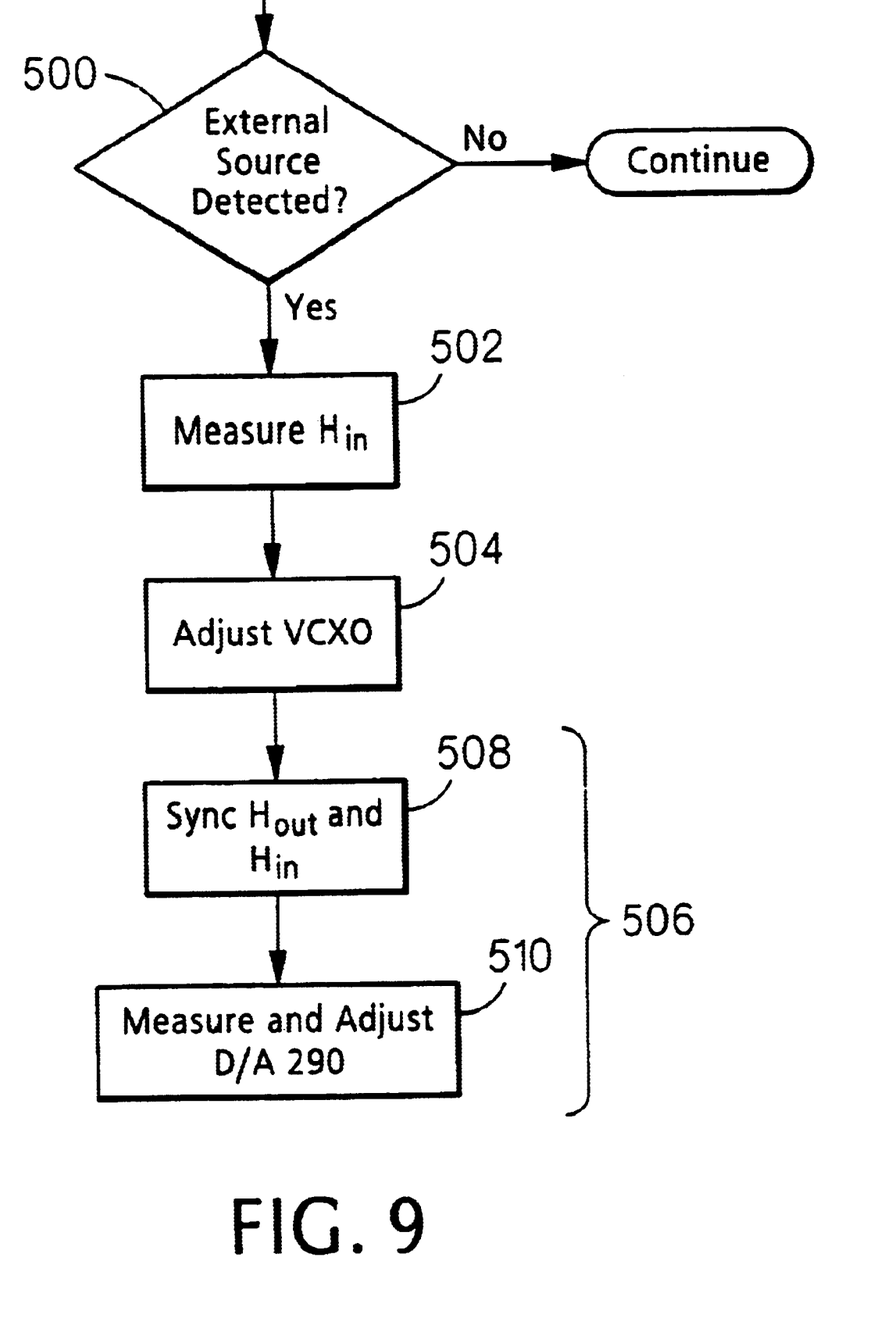
FIG. 9 illustrates operation of the GENLOCK method.

First, referring to FIG. 9, upon enabling and automatically detecting an external source (step 500), a frequency detector 296 measures the $H_{in}$ period in numbers of 27 Mhz clock samples. (step 502) The VCXO 293 is then adjusted until the number of clocks per line is correct (1716 for NTSC, and 1728 for PAL). (step 504) The second step of the phase lock process, further adjusts frequency and aligns the phases of $H_{out}$ and $H_{in}$. (step 506) This is achieved by first synchronizing $H_{out}$ with $H_{in}$ (step 508), then measuring and adjusting the D/A 290 for each clock sample of phase difference detected. (step 510) A "snap" algorithm is applied to achieve minimum alignment time. This algorithm is based upon a continuous or analog model of phase locking. As the two signals "slide" in phase with respect to one another, the phase lock loop attempts to "pull" or adjust the VCXO. When the VCXO frequency passes through that state in which $H_{out}$ and $H_{in}$ are equal, the direction of the "slide" will change. The frequency/phase detector 296 is illustrated in greater detail in FIG. 8.

A continuous system is approximated by adjusting the VCXO in equal frequency increments every line time. In this way, the rate of change of the frequency is linear. When the slope of the frequency change is zero, the desired frequency is achieved. As the VCXO is adjusted, the phase difference will begin at and return to a set threshold level in a short amount of time. The lock frequency is the midpoint of the frequency difference between the threshold frequencies. (This is the point where the slope is zero.) This frequency is loaded into the D/A converter the next time the phase difference is zero, causing a "snapping" effect to the desired frequency.

Additions, subtractions and other modifications of the invention will be apparent to those practiced in this field.

What is claimed is:

1. A method for playing compressed multimedia streams comprising:

generating synchronized clock signals for a first decoder and for a second decoder;

playing a first compressed multimedia stream based on the clock signal generated for the first decoder;

storing data for a second compressed multimedia stream to enable the second decoder to begin playing at a transition time in the second compressed multimedia stream; and switching from the output of the first decoder to the output of the second decoder at the transition time in the second compressed multimedia stream, including forming a seamless transition from the first compressed multimedia stream by beginning to play from the second decoder using the stored data for the second compressed multimedia stream, based on the clock signal generated for the second decoder.

2. The method of claim 1 wherein each of the first and second compressed multimedia streams comprises compressed video data.

3. The method of claim 1 wherein storing the data for the second compressed multimedia stream includes decoding the second compressed multimedia stream up to the transition time in the second compressed multimedia stream.

4. The method of claim 1 wherein the data for the second compressed multimedia stream comprises decompressed video frames for presentation after the transition time in the second compressed multimedia stream.

5. The method of claim 1 wherein the data for the second compressed multimedia stream further comprises information associated with decompression of compressed video frames in the second compressed multimedia stream.

6. The method of claim 5 wherein the information comprises decoding time stamps and presentation time stamps.

7. The method of claim 1 wherein the switching is controlled by a module separate from the first decoder and the second decoder.

8. The method of claim 7 wherein the module includes a central processing unit.

9. The method of claim 7 wherein the module initiates the playing of the second compressed multimedia stream at the transition time in the second compressed multimedia stream.

10. The method of claim 9 wherein the stored data for the second compressed multimedia stream that is used to begin playing at the transition time in the second compressed multimedia stream is stored for at least some time prior to beginning to play at said transition time.

11. The method of claim 7 wherein beginning to play from the second decoder comprises the module sending a command to the second decoder to resume decoding based on the stored data for the second compressed multimedia stream.

12. The method of claim 11 wherein decoding based on the stored data for the second compressed multimedia stream comprises decompressing compressed video frames, and presenting the decompressed video frames.

13. The method of claim 1 wherein generating synchronized clock signals comprises producing vertical and horizontal synchronization signals for the first and second decoders based on a same reference clock signal.

14. A method for playing compressed multimedia streams comprising:

generating synchronized clock signals for a first decoder and for a second decoder;

playing a first compressed multimedia stream from the first decoder based on the clock signal generated for the first decoder;

selecting compressed multimedia data packets from a second compressed multimedia stream based on decoding and presentation time stamps extracted from the second compressed multimedia stream;

storing the selected compressed multimedia data packets in a random access memory associated with the second decoder such that the second compressed multimedia stream is available to begin playing at a transition time from the first compressed multimedia stream; and switching from the output of the first decoder to the output of the second decoder, beginning to play from the second decoder at the transition time based on the clock signal generated for the second decoder.

15. The method of claim 14, wherein selecting, storing, and switching is controlled by a central processing unit that controls movement of the compressed multimedia data packets from the random access memory to the second decoder such that, at the transition time, a compressed multimedia data packet is available for decoding by the second decoder and a decompressed multimedia data packet is available for playing by the second decoder.

16. The method of claim 15, wherein the decompressed multimedia data packet comprises a frame having a presentation time stamp associated with the transition time, and the compressed multimedia data packet comprises a desired reference frame having a decoding time stamp associated with the transition time.

17. The method of claim 14, wherein generating synchronized clock signals comprises producing vertical and horizontal synchronization signals for the first and second decoders based on a same reference clock signal.

18. A method for playing compressed multimedia streams comprising:

generating synchronized clock signals for a first decoder and for a second decoder;

playing a first compressed multimedia stream from the first decoder based on the clock signal generated for the first decoder;

selecting compressed multimedia data packets from a second compressed multimedia stream based on decoding and presentation time stamps extracted from the second compressed multimedia stream;

storing the selected compressed multimedia data packets in a random access memory associated with the second decoder such that the second compressed multimedia stream is available to begin playing at a transition time from the first compressed multimedia stream;

switching from the output of the first decoder to the output of the second decoder with a seamless transition from the first compressed multimedia stream to the second compressed multimedia stream, at the transition time;

playing a decompressed multimedia data packet from the second decoder, at the transition time, based on the clock signal generated for the second decoder, the decompressed multimedia data packet having a presentation time stamp associated with the transition time; and decoding a compressed multimedia data packet from the second decoder, at the transition time, based on the clock signal generated for the second decoder, the compressed multimedia data packet having a decoding time stamp associated with the transition time.

* * * * *